(12) United States Patent
Hung

(10) Patent No.: US 7,600,296 B1
(45) Date of Patent: Oct. 13, 2009

(54) HINGE STRUCTURE WITH A DISC LOCKING MECHANISM

(75) Inventor: Lin-Kai Hung, Taipei County (TW)

(73) Assignee: Protorsion Hinge Co., Ltd., Taipei County (TW)

( * ) Notice: Subject to any disclaimer, the term of this patent is extended or adjusted under 35 U.S.C. 154(b) by 0 days.

(21) Appl. No.: 12/168,406

(22) Filed: Jul. 7, 2008

(30) Foreign Application Priority Data

Jun. 12, 2008 (TW) .............................. 97210383 U

(51) Int. Cl.
*E05C 17/64* (2006.01)
(52) U.S. Cl. ......................................... 16/337; 16/342
(58) Field of Classification Search .................... 16/337, 16/342, 344, 374, 380, 275, 276, 303, 330, 16/334
See application file for complete search history.

(56) References Cited

U.S. PATENT DOCUMENTS 1,383,961 A * 7/1921 Melugin ...................... 16/314
6,813,813 B2 * 11/2004 Lu et al. ....................... 16/342
6,832,411 B2 * 12/2004 Koshikawa et al. ........... 16/330
7,171,726 B2 * 2/2007 Kleissen et al. ............... 16/235
7,222,396 B2 * 5/2007 Lu et al. ....................... 16/340
7,377,012 B2 * 5/2008 Lu .............................. 16/342
2007/0234514 A1 * 10/2007 Chien .......................... 16/330
2008/0295288 A1 * 12/2008 Hung ........................... 16/275

* cited by examiner

*Primary Examiner*—William L. Miller
(74) *Attorney, Agent, or Firm*—Rosenberg, Klein & Lee

(57) ABSTRACT

A hinge structure includes a pivot shaft, a knuckle receiving the pivot shaft rotatably therein, and a disc locking mechanism. The knuckle has a front-end face formed with a retention recess. The locking mechanism includes a positioning disc disposed adjacent to the front-end face of the knuckle to permit extension of the pivot shaft therethrough, and having an inner surface facing the front-end face and formed with a reception recess. The positioning disc is rotatable simultaneously with the pivot shaft. A roller is sandwiched between the front-end face and the positioning disc in such a manner to engage the retention recess and the reception recess when the retention recess is aligned with the reception recess, thereby preventing rotation of the pivot shaft in the knuckle.

9 Claims, 10 Drawing Sheets

HINGE STRUCTURE WITH A DISC LOCKING MECHANISM

FIELD OF THE INVENTION

The present invention relates to a hinge structure, and more particularly to a hinge structure having a disc locking mechanism with a positioning disc for locking a pivot shaft relative to a knuckle in the hinge structure.

BACKGROUND OF THE INVENTION

In our daily life, a hinge structure is implemented when two objects are required to be folded relative to each other. The hinge structure available presently generally consists of a male member and a female member. The male member generally includes a pivot shaft and a coupling portion while the female member includes a knuckle and a coupling portion. Under the normal condition, the pivot shaft extends rotatably into the knuckle while one object is mounted on the coupling portion. Another object is mounted on the coupling portion of female member such that the two objects can be folded onto or unfolded away from each other about an axis of the pivot shaft.

In actual practice, a positioning device is disposed between the pivot shaft and the knuckle in order to lock the male and female members together.

However, during locking operation of the pivot shaft within the knuckle, since the pivot shaft and the knuckle are mostly made from rigid materials, a flexible positioning device is generally implemented in order to absorb the distort deformation among the elements or the dimension interference. Thus, the flexible positioning device is subjected to suffer from wearing and flexible fatigue thereof. In other words, the service life of the conventional hinge structure is shortened consequently.

SUMMARY OF THE INVENTION

The present invention is to provide a hinge structure that includes a disc locking mechanism adapted to absorb majority of interference distortion energy caused due to rotation of a pivot shaft within a knuckle of the hinge structure.

In accordance with the present invention, a hinge structure is provided to include a pivot shaft, a knuckle and a disc locking mechanism. The pivot shaft extends along a longitudinal axis. The knuckle receives the pivot shaft rotatably therein, and has a front-end face formed with a retention recess. The locking mechanism includes a positioning disc disposed adjacent to the front-end face of the knuckle to permit extension of the pivot shaft therethrough, and having an inner surface facing the front-end face and formed with a reception recess. The positioning disc is rotatable simultaneously with the pivot shaft. A roller is sandwiched between the front-end face and the positioning disc and is received in either one of the retention recess or the reception recess.

When the retention recess in the front-end face is aligned with the reception recess in the positioning disc, the roller engages the retention recess and the reception recess, thereby preventing rotation of the pivot shaft in the knuckle. When the roller is disengaged from the retention recess and the reception recess, the positioning disc is spaced inclinedly relative to the front-end face due to rotation of the pivot shat in the knuckle.

The advantage provided by the present hinge structure resides in that since the locking mechanism includes a roller and a positioning disc, which slight inclination relative to the front-end face of the knuckle or its flexibility results in interference distortion energy to absorb a partial deformation, thereby freeing the knuckle and the pivot shaft from severe wearing, which, in turn, prolonging the service life of the present hinge structure.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

Figure 1:
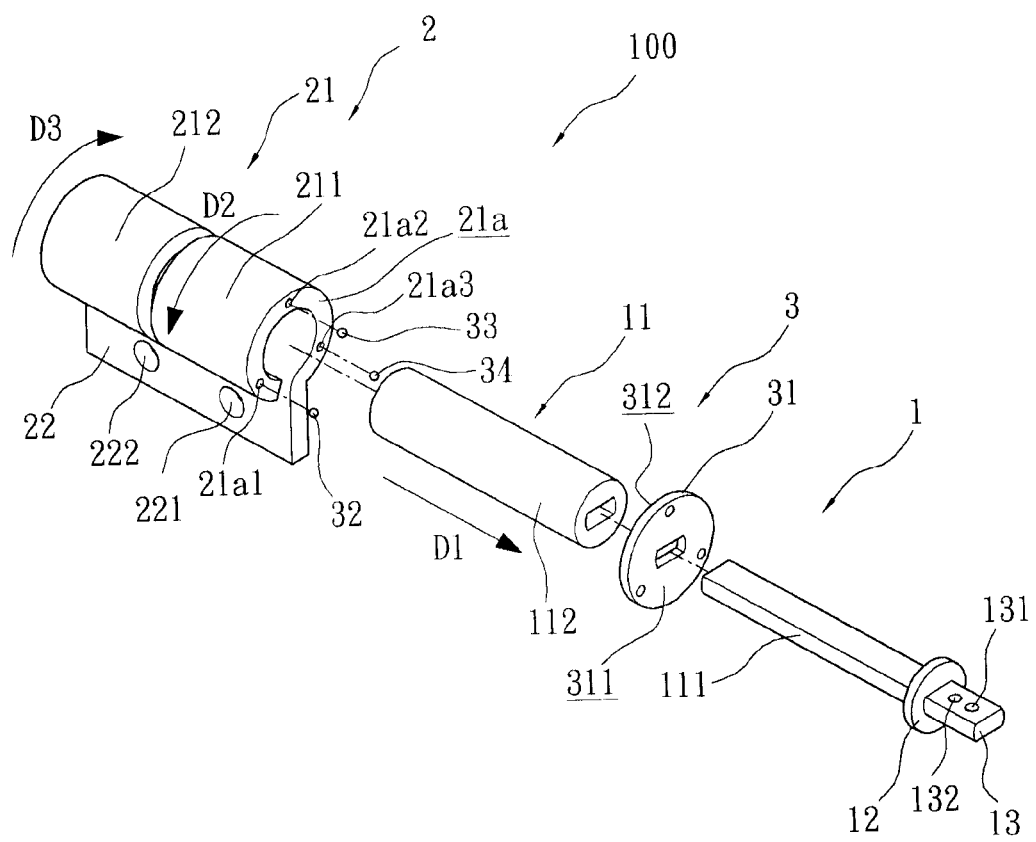
FIG. 1 is an exploded and perspective view of the first embodiment of a hinge structure of the present invention.
Figure 2:
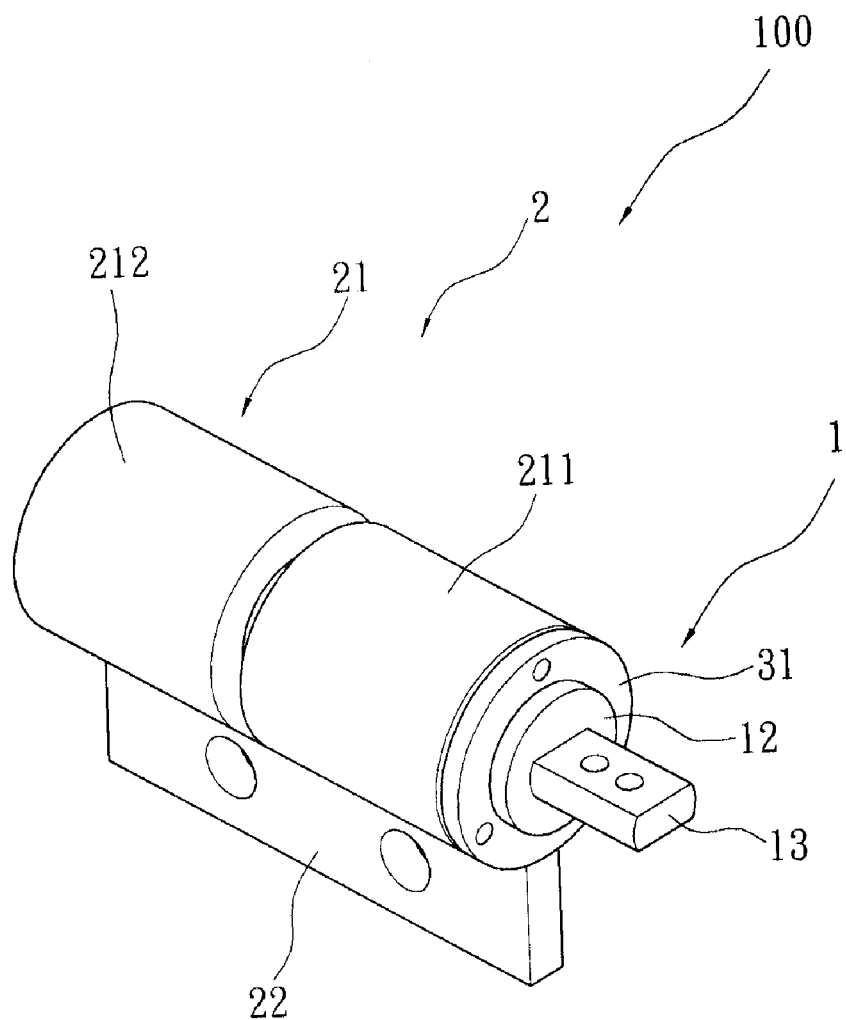
FIG. 2 is an assembled and perspective view of the first embodiment of the hinge structure of the present invention.
Figure 3:
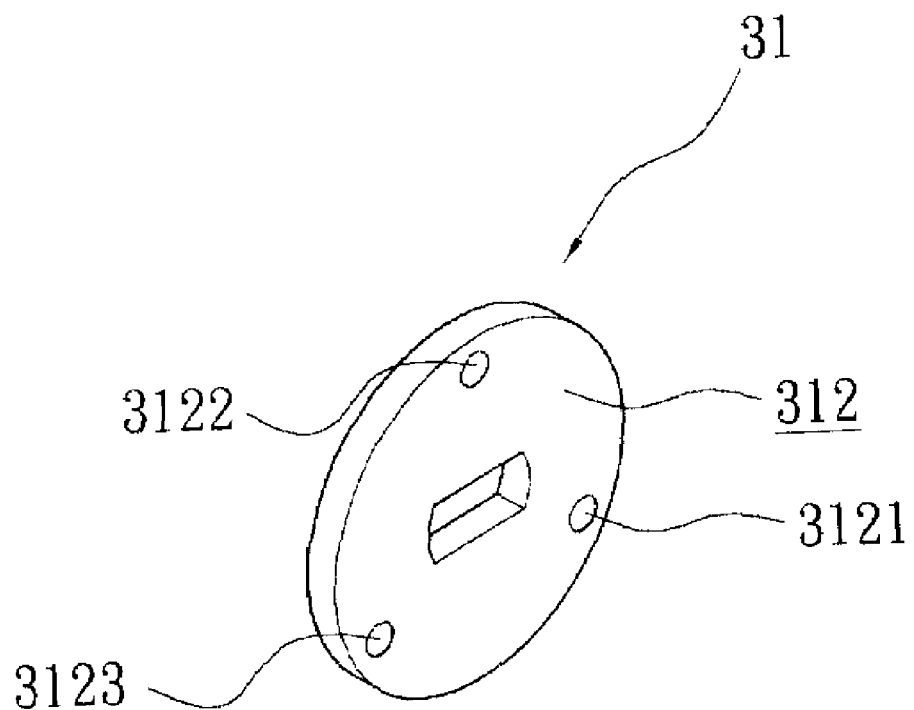
FIG. 3 is a perspective view of a positioning disc employed in the first embodiment of the hinge structure of the present invention.

Referring to FIGS. 1-3, wherein FIG. 1 is an exploded and perspective view of the first embodiment of a hinge structure of the present invention and FIG. 2 is an assembled and perspective view of the first embodiment of the hinge structure of the present invention. FIG. 3 is a perspective view of a positioning disc employed in the first embodiment of the hinge structure of the present invention. As illustrated, the hinge structure 100 accordingly includes a male member 1, a female member 2 and a disc locking mechanism 3. The male member 1 includes a pivot shaft 11, a stop member 12 and a male coupling portion 13.

The pivot shaft 11 is in cylindrical shape and extends along a longitudinal axis D1. The male member 1 further includes a base shaft 111 extending through the pivot shaft 11, is co-rotatable simultaneously with pivot shaft 11, and holds the coupling portion 13 at end thereof. The coupling portion 13 is formed with two fastening holes 131, 132 for fastening a first object. The stop member 12, generally a circular disc shape, is fixed on the base shaft 111 adjacent to the coupling portion 13. After assembly, the stop member 12 and the coupling portion 13 are exposed from the knuckle 21.

The female member 2 includes a knuckle 21 receiving the pivot shaft 11 rotatably therein and exposing the stop member 12 and the coupling portion 13 from a front-end face 21a thereof. At this time, the front-end face 21a and the stop member 12 cooperatively define an operating gap (A) (see FIG. 5). The knuckle 21 further includes a knuckle body having a front knuckle section 211 defining the front-end face 21a, a rear knuckle section 212 disconnected from the front knuckle section 211 and a coupling portion 22 integrally formed with the front and rear knuckle sections 211, 212 such that the front and rear knuckle sections 211, 212 are formed by rolling in opposite directions D2, D3 along a circular path to enclose the pivot shaft 11. The coupling portion 22 of the knuckle 21 is formed with two fastening holes 221, 222 for fastening with a second object. The front-end face 21a is formed with three retention recesses 21a1, 21a2, 21a3.

The disc locking mechanism 3 includes a positioning disc 31 and three rollers 32, 33, 34. The positioning disc 31 is disposed within the operation gap (A) between the front-end face 21a of the knuckle 21 and the stop member 12 to permit extension of the base shaft 111 therethrough. The positioning disc 31 is coupled to and rotatable simultaneously with the pivot shaft 111, and has an inner surface 312 facing the front-end face 21a and an outer surface 311 opposite to the inner surface 312. The inner surface 312 of the positioning disc 31 is and formed with three reception recesses 3121, 3122, and 3123. The three rollers 32, 33, 34 are respectively disposed within the retention recesses 21a1, 21a2, 21a3 in the front-end face 21a of the knuckle 21. In this embodiment, the rollers 32, 33, 34 are rolling balls while the retention recesses 3121, 3122, and 3123 are concave recesses to partially receive the rolling balls therein. After assembly, the stop member 12 is disposed exterior to the positioning disc 31 to prevent untimely disengagement of the positioning disc 31 from the knuckle 21.

Figure 4:
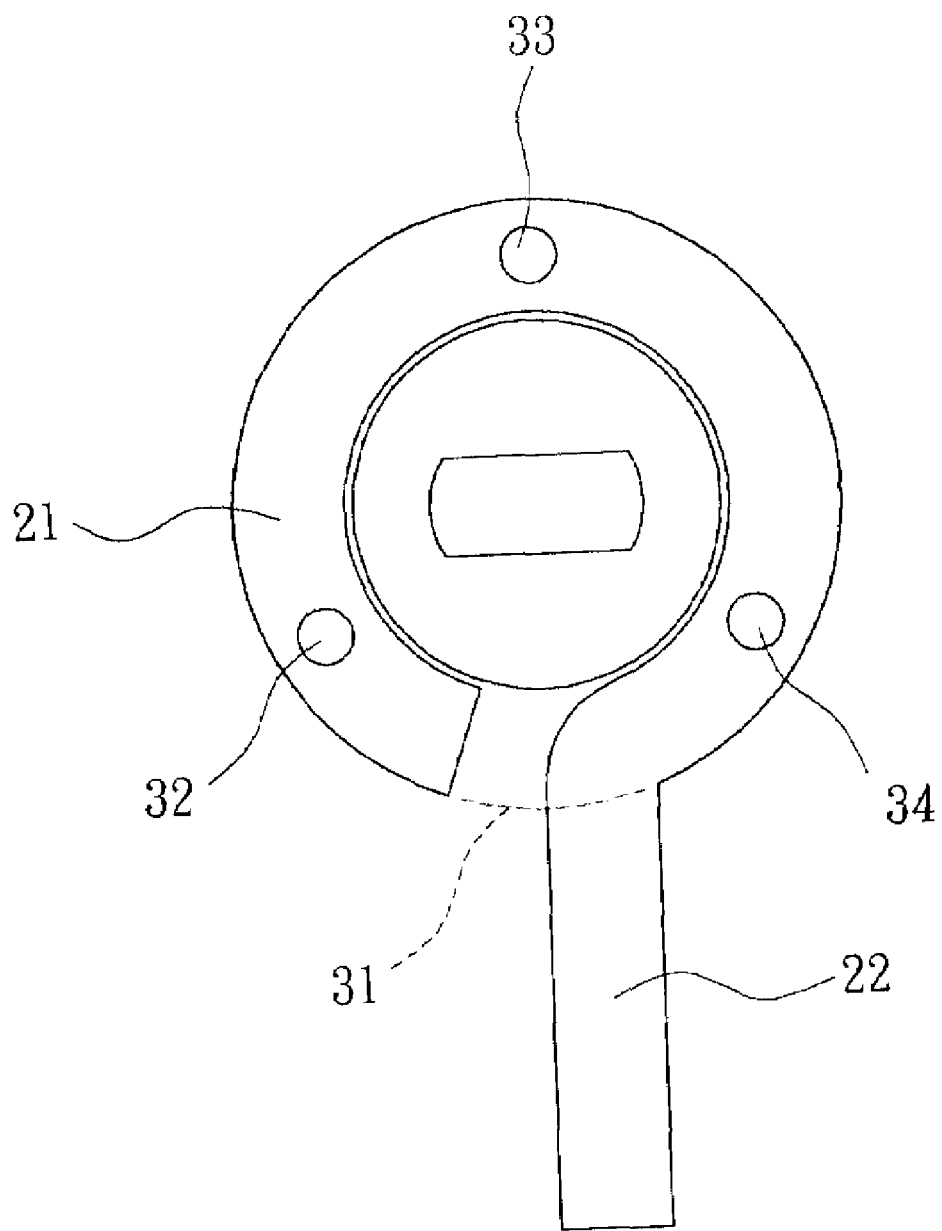
FIG. 4 is a front view to illustrate the positioning disc being locked in order to prevent rotation of a pivot shaft in the first embodiment of the hinge structure of the present invention.
Figure 5:
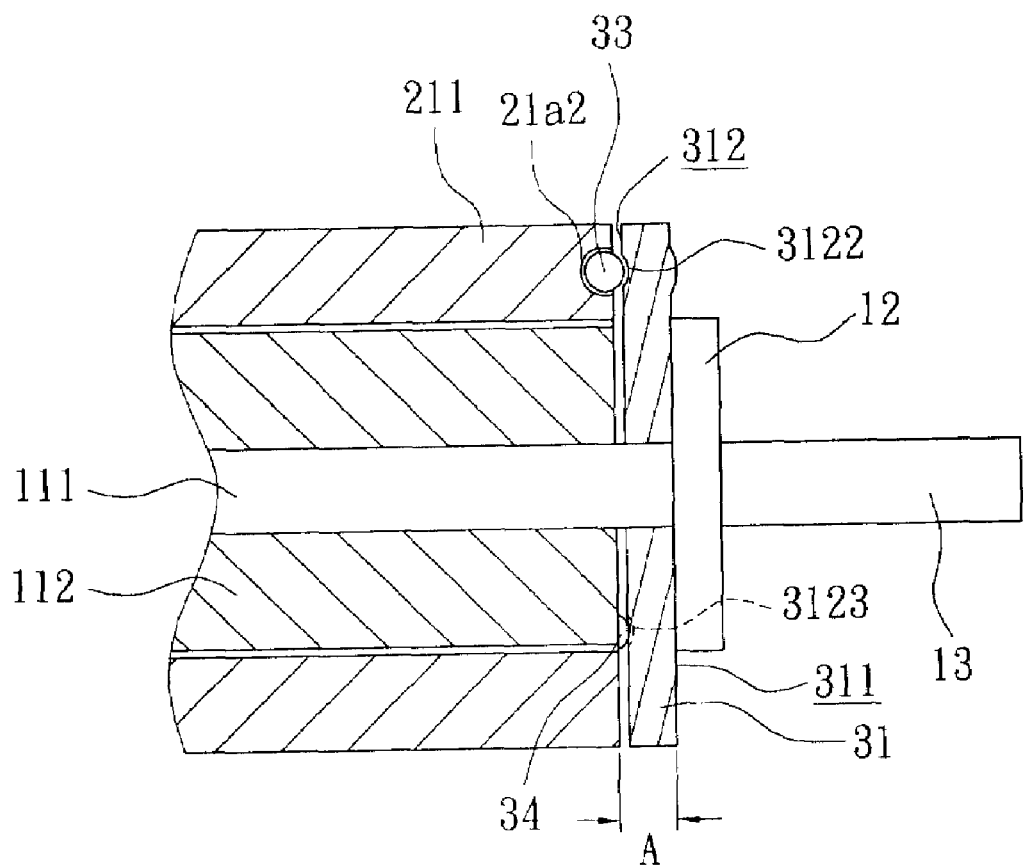
FIG. 5 is a fragmentary cross-sectional view to illustrate the positioning disc being locked in order to prevent rotation of a pivot shaft in the first embodiment of the hinge structure of the present invention.

Referring to FIGS. 4 and 5, wherein FIG. 4 is a front view to illustrate the positioning disc 31 being locked in order to prevent rotation of the pivot shaft 11 in the first embodiment of the hinge structure of the present invention. FIG. 5 is a fragmentary cross-sectional view to illustrate the positioning disc 31 being locked in order to prevent rotation of the pivot shaft 11 in the first embodiment of the hinge structure of the present invention. Since the rollers 32, 33, 34 are sandwiched between the front-end face 21a and the positioning disc 31, the rollers 32, 33, 34 engage the retention recesses 21a1, 21a2, 21a3 and the reception recesses 3121, 3122, 3123 when the retention recesses 21a1, 21a2, 21a3 in the front-end face 21a are aligned respectively with the reception recesses 3121, 3122, 3123 in the positioning disc 31, thereby preventing rotation of the pivot shaft 11 in the knuckle 21.

As best shown in FIG. 5, due to engagement of the rollers 32, 33, 34 relative to the retention recesses 21a1, 21a2, 21a3 and the reception recesses 3121, 3122, 31233121, the positioning disc 31 is spaced from the front-end face 21a in a parallel manner to define the operation gap (A) with uniform width through out an entire length of the gap (A).

Figure 6:
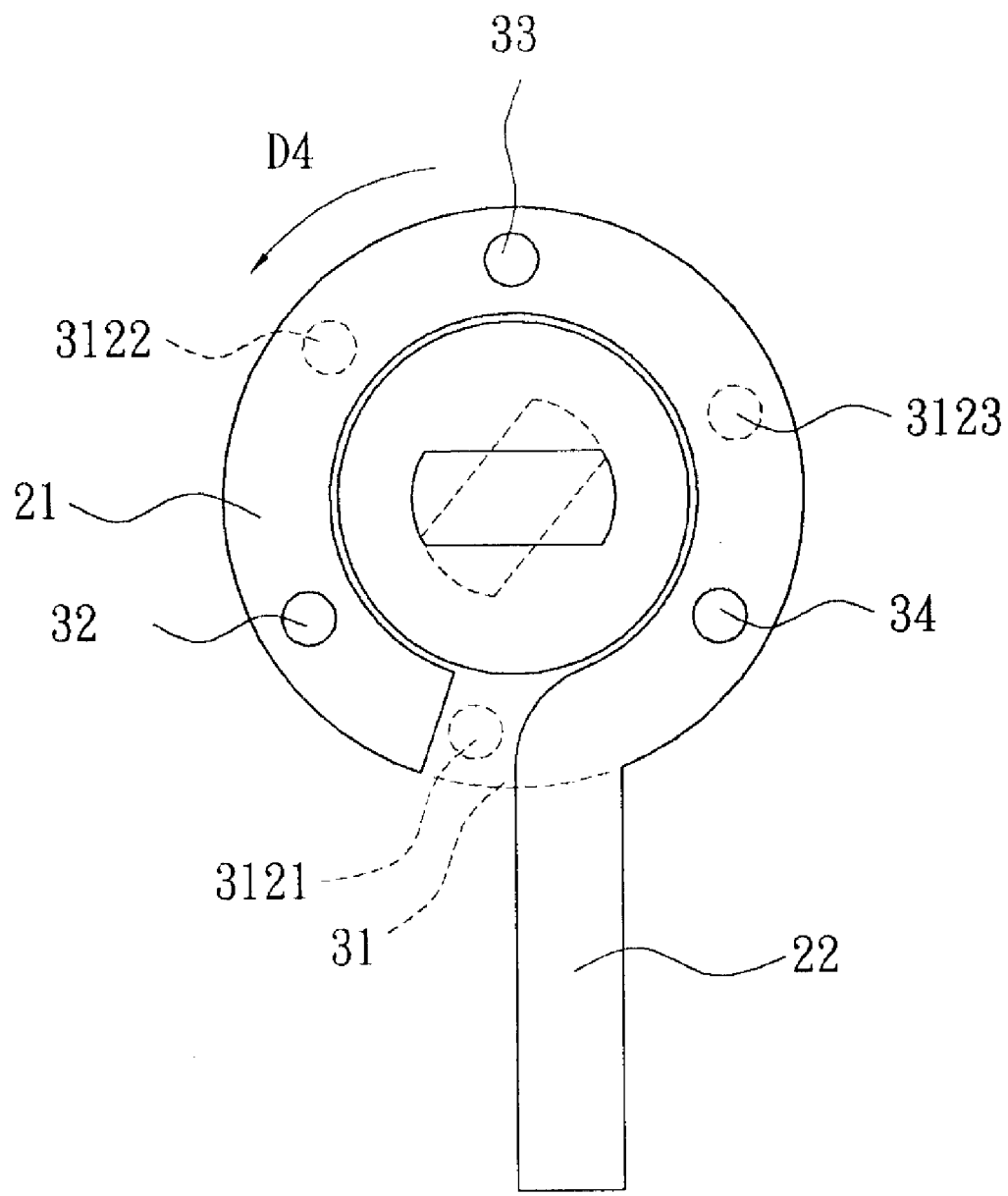
FIG. 6 is a front view to illustrate the positioning disc being disengaged in order to permit rotation of the pivot shaft together with the position disc in the first embodiment of the hinge structure of the present invention.
Figure 7:
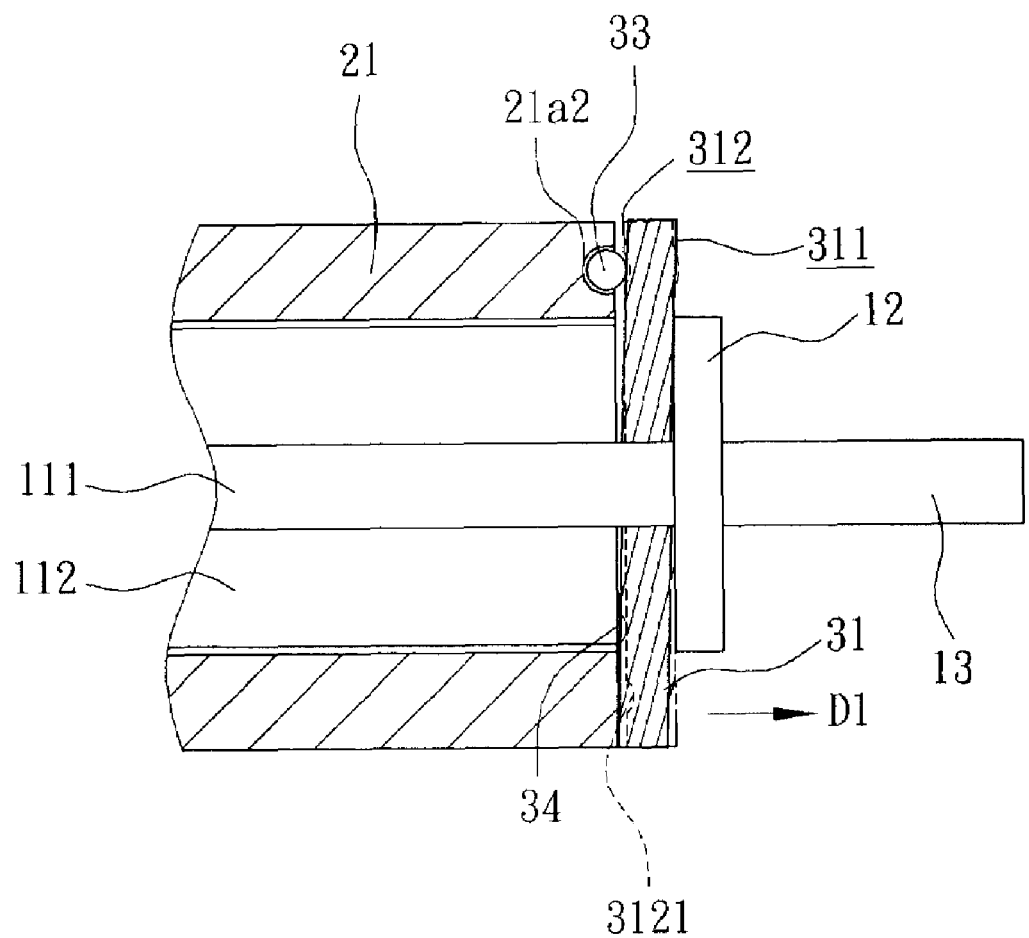
FIG. 7 is a fragmentary cross-sectional view to illustrate the positioning disc being disengaged in order to permit rotation of the pivot shaft together with the position disc in the first embodiment of the hinge structure of the present invention.

Referring to FIGS. 6 and 7, wherein FIG. 6 is a front view to illustrate the positioning disc 31 being disengaged in order to permit rotation of the pivot shaft 11 together with the position disc 31 in the first embodiment of the hinge structure of the present invention. FIG. 7 is a fragmentary cross-sectional view to illustrate the positioning disc 31 being disengaged in order to permit rotation of the pivot shaft 11 together with the position disc 31 in the first embodiment of the hinge structure of the present invention.

When it is desired to unlock the pivot shaft 11 relative to the knuckle 21, the pivot shaft 11 is rotated along the D4 direction as best shown in FIG. 6, in which, the positioning disc 31 is rotated together with the pivot shaft 11 relative to the front-end face 21a, thereby resulting in staggered position (not align) among the retention recesses 21a1, 21a2, 21a3 and the reception recesses 3121, 3122, 3123 and disengaging the rollers 32, 33, 34 from the retention recesses 21a1, 21a2, 21a3. Under this condition, the positioning disc 31 is spaced inclinedly relative to the front-end face 21a (transverse to the longitudinal axis D1), thereby defining the gap (A) with non-uniform width. Note that the inclination of the positioning disc 31 generates interference distortion energy to absorb the flexible deformation of the pivot shaft 11 and the knuckle 21.

For those persons skilled in the art since it is the interference distortion energy caused due to inclination of the positioning disc 31 during the disengagement of the disengaging the rollers 32, 33, 34 from the retention recesses 21a1, 21a2, 21a3, severe wearing between the pivot shaft 11 and the knuckle 21 is avoided, thereby prolonging the service life of the male and female members 1, 2 in the hinge structure of the present invention.

Figure 8:
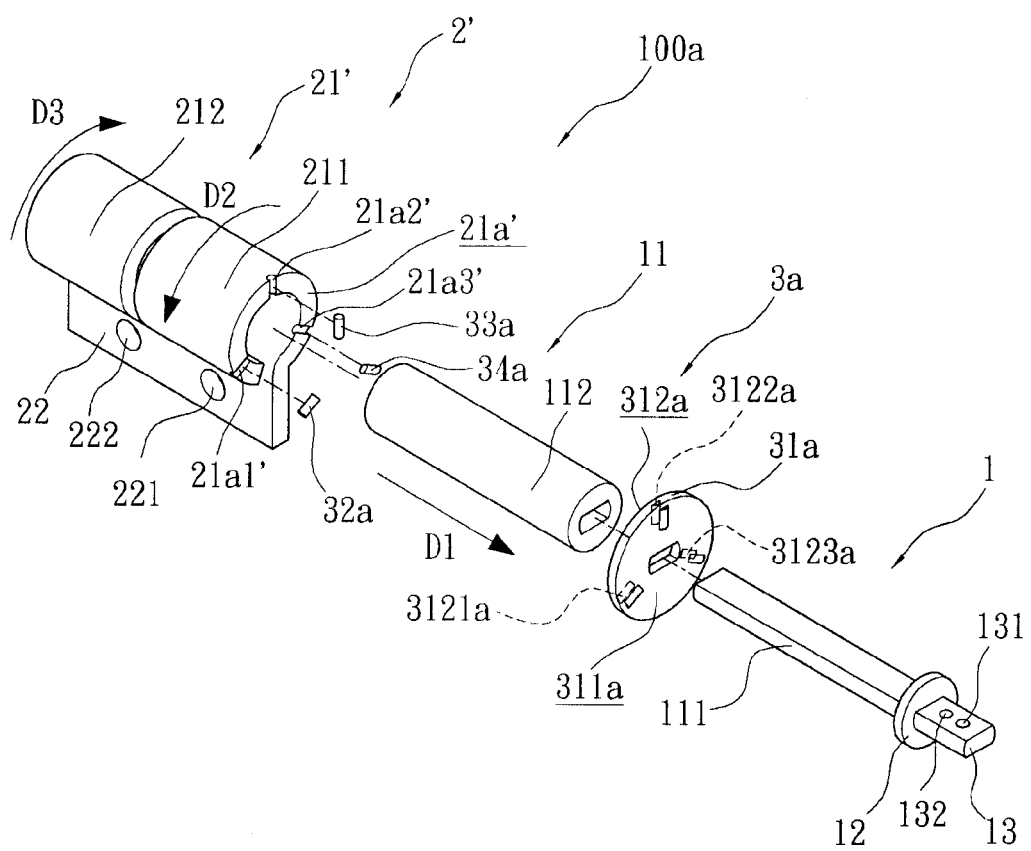
FIG. 8 is an exploded and perspective view of the second embodiment of the hinge structure of the present invention.

FIG. 8 is an exploded and perspective view of the second embodiment of the hinge structure 100a of the present invention and has the structure similar to the first embodiment. The only difference resides in that the front-end face 21a' is formed with three 21a1', 21a2', 21a3'.

The disc locking mechanism 3a includes a positioning disc 31a and three rollers 32a, 33a, 34a. The positioning disc 31a is disposed within the operation gap (A) between the front-end face 21a' of the knuckle 21' and the stop member 12 to permit extension of the base shaft therethrough. The positioning disc 31a is coupled to and rotatable simultaneously with the pivot shaft, and has an inner surface 312a facing the front-end face 21a'. The inner surface 312a of the positioning disc 31a is and formed with three reception recesses 3121a, 3122a, 3123a. The three rollers 32a, 33a, 34a are respectively disposed within the retention recesses 21a1', 21a2', 21a3' in the front-end face 21a' of the knuckle 21'. In this embodiment, the rollers 32a, 33a, 34a are cylindrical rollers while the retention recesses 21a1', 21a2', 21a3' in the front-end face 21a' are semi-cylindrical recesses to partially receive the cylindrical rollers therein.

Figure 9:
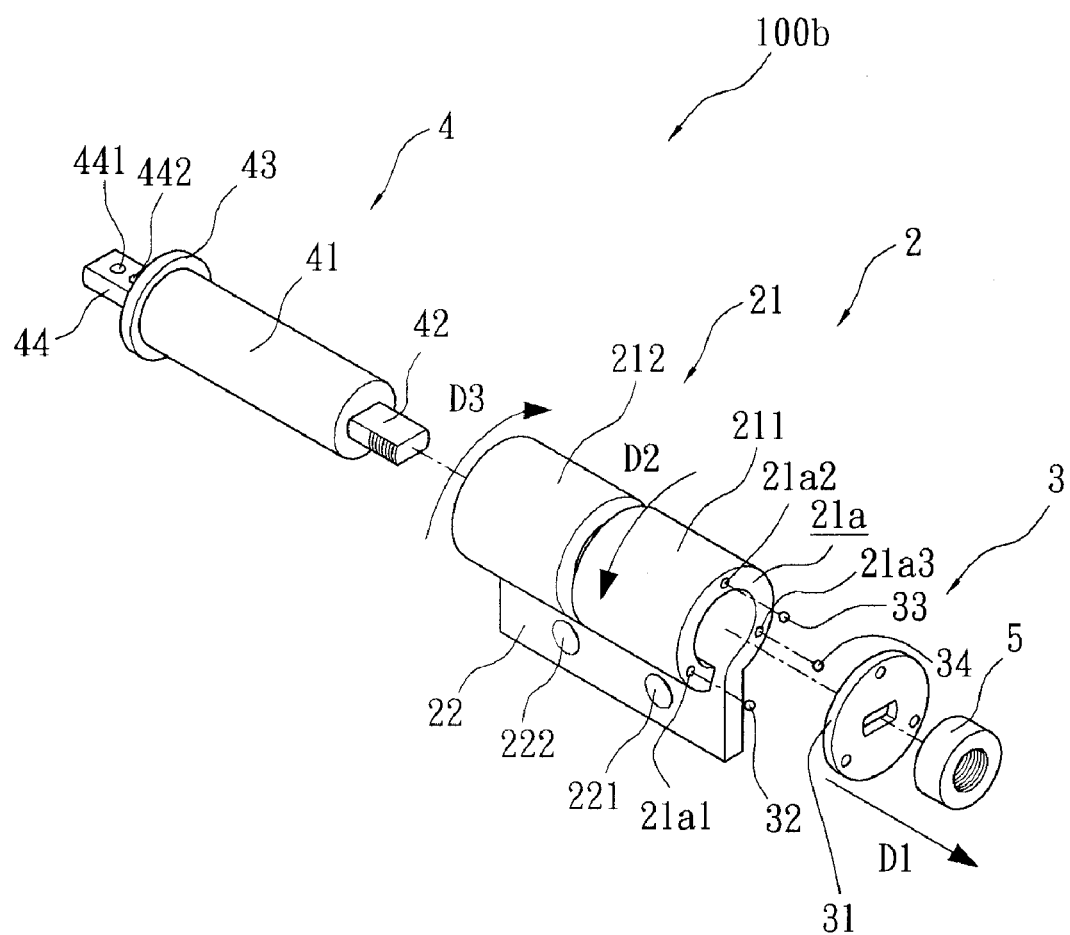
FIG. 9 is an exploded and perspective view of the third embodiment of the hinge structure of the present invention.

FIG. 9 is an exploded and perspective view of the third embodiment of the hinge structure 100b of the present invention and has the structure similar to the first embodiment. The only difference resides in the structure of the male member 4 and a fastener nut 5. As illustrated, the male member 4 includes a pivot shaft 41, a base shaft coupled to and extending through the pivot shaft 41 and has front and rear extension portions 42, 44, wherein the rear extension portion 44 is exposed from a rear end face of the knuckle 21 for serving as the coupling portion formed with two fastening holes 441, 442. Another stop member 43 fixed on the rear extension portion 44 to prevent disengagement of the pivot shaft 41 from the rear end surface.

After assembly, the front extension portion 42 of the pivot shaft 41 is exposed from the front-end face 21a of the knuckle 21. The position disc 31 is attached securely on the front extension portion 42 facing the front-end face 21a for simultaneous rotation with the pivot shaft 41. The fastener nut 5 is mounted threadedly on the front extension portion 42 exterior to the positioning disc 31 to prevent disengagement of the positioning disc 31 from the front-end face 21a of the knuckle 21.

Figure 10:
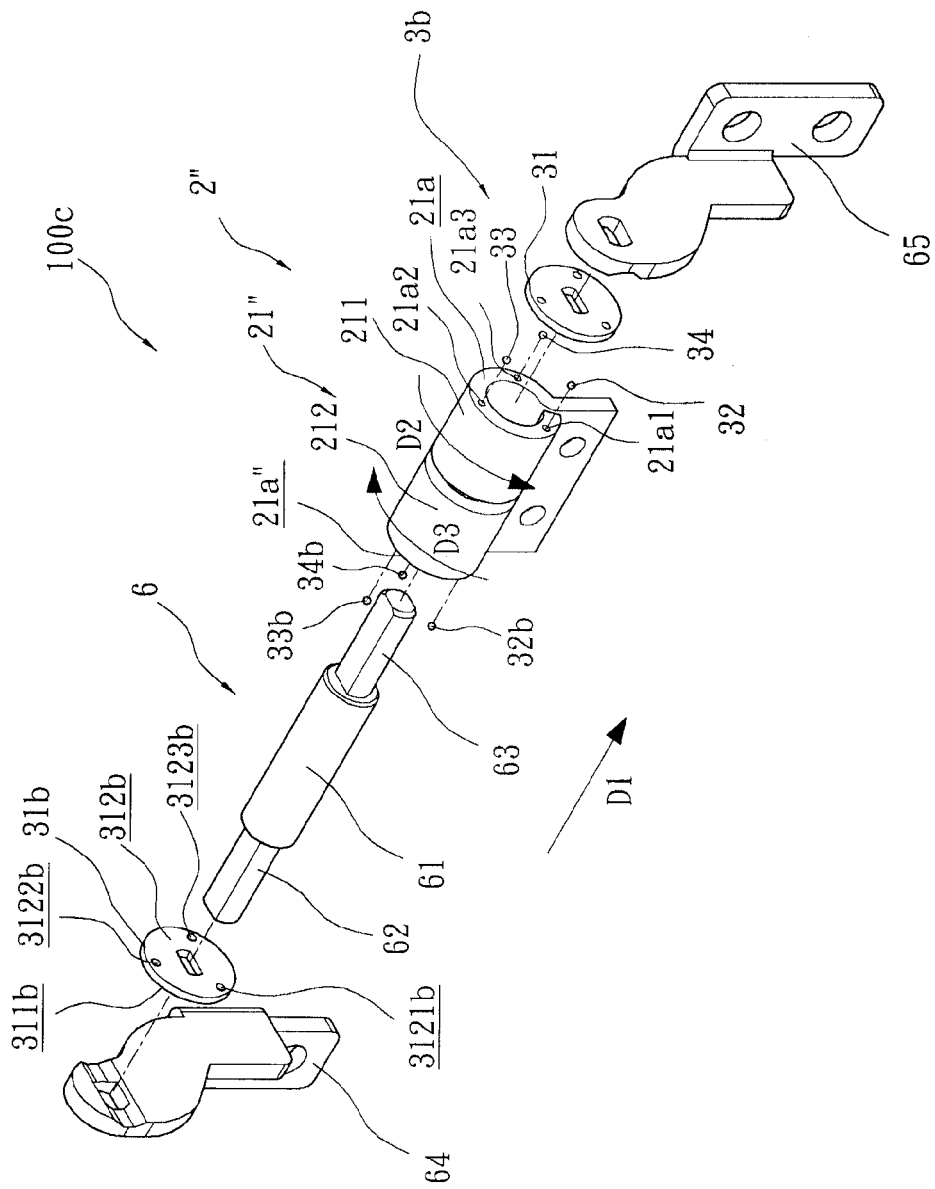
FIG. 10 is an exploded and perspective view of the fourth embodiment of the hinge structure of the present invention.

FIG. 10 is an exploded and perspective view of the fourth embodiment of the hinge structure 100c of the present invention. The hinge structure 100c includes a male member 6, a female member 2" and a disc locking mechanism 3b. The male member 6 includes a pivot shaft 61 having front and rear extension portions 63, 62 respectively exposed from the front and rear end faces 21a, 21a" of the knuckle 21". Two coupler members 64, 65 are fixed on the front and rear extension portions 63, 62 of the pivot shaft 61 for co-rotation with the pivot shaft 61.

Each of the front and rear end faces 21a, 21a" of the knuckle 21" is formed with three retention recesses 21a1, 21a2, 21a3. The disc locking mechanism 3b includes front and rear positioning discs 31, 31b and two roller sets, each set including three rollers 32b, 33b, 33b.

In this embodiment, the front and rear positioning discs 31, 31b are coupled securely on the front and rear extension portions 63, 62 respectively facing the front and rear end faces 21a, 21a" interior to the coupler members 64,65 for simultaneous rotation with the pivot shaft 61. Each of the positioning discs 31, 31b has an inner surface 312, 312b formed with three reception recesses (3121, 3122, 3123), (3121b, 3122b, 3123b). Since each set of the rollers 32, 33, 34 are sandwiched between adjacent pair of the end face and the respective positioning disc, the rollers 32, 33, 34 engage the retention recesses 21a1, 21a2, 21a3 and the reception recesses 3121, 3122, 3123 when the retention recesses (21a1, 21a2, 21a3) in the front and rear end faces 21a, 21a" are aligned respectively with the reception recesses (3121, 3122, 3123) (3121b, 3122b, 3123b) in the front and rear positioning discs 31, 31b, thereby preventing rotation of the pivot shaft 11 in the knuckle 21".

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A hinge structure comprising:
   a pivot shaft extending along a longitudinal axis;
   a knuckle receiving said pivot shaft rotatably therein, and having a front-end face formed with a retention recess; and
   a disc locking mechanism including:
      a positioning disc disposed adjacent to said front-end face of said knuckle and including an aperture to permit extension of said pivot shaft therethrough, said positioning disc being rotatable simultaneously with said pivot shaft and having an inner surface facing said front-end face and formed with a reception recess, and
      a roller sandwiched between said front-end face and said positioning disc in such a manner to engage said retention recess and said reception recess when said retention recess in said front-end face is aligned with said reception recess in said positioning disc, thereby preventing rotation of said pivot shaft in said knuckle.

2. The hinge structure according to claim 1, wherein said positioning disc is spaced parallelly from said front-end face to define a gap with uniform width through out an entire length of said gap due to engagement of said roller relative to said retention recess and said reception recess, said positioning disc being spaced inclinedly relative to said front-end face when said roller is disengaged from said retention recess and said reception recess due to rotation of said pivot shat in said knuckle, thereby defining a gap with non-uniform width, the hinge structure further comprising a stop member fixed on said pivot shaft at one end thereof exterior to said positioning disc to prevent disengagement of said positioning disc from said knuckle.

3. The hinge structure according to claim 1, wherein said roller is a rolling ball.

4. The hinge structure according to claim 1, wherein said roller is a cylindrical roller.

5. The hinge structure according to claim 1, wherein said knuckle includes a knuckle body having a front knuckle section defining said front-end face, and a rear knuckle section disconnected from said front knuckle section such that said front and rear knuckle sections are formed by rolling along a circular path.

6. The hinge structure according to claim 1, said knuckle includes a knuckle body having a front knuckle section defining said front-end face, a rear knuckle section disconnected from said front knuckle section and a coupling portion integrally formed with said front and rear knuckle sections in order to form a female member such that said front and rear knuckle sections are formed by rolling along a circular path opposite to each other.

7. The hinge structure according to claim 6, wherein said coupling portion of said knuckle is formed with a fastening hole.

8. The hinge structure according to claim 1, further comprising a coupling portion extending from and cooperating with said pivot shaft to form a male member.

9. The hinge structure according to claim 8, wherein said coupling portion of said male member is formed with a fastening hole.

* * * * *